United States Patent [19]

Craig

[11] Patent Number: 4,684,704
[45] Date of Patent: Aug. 4, 1987

[54] HYDROPHOBICALLY MODIFIED HYDROXYETHYL CELLULOSE IN AQUEOUS POLYMERIZATION DISPERSIONS

[75] Inventor: Daniel H. Craig, Hockessin, Del.

[73] Assignee: Hercules Incorporated, Wilmington, Del.

[21] Appl. No.: 876,954

[22] Filed: Jun. 19, 1986

[51] Int. Cl.$^4$ .............................................. C08F 2/20
[52] U.S. Cl. ..................................... 526/200; 526/330
[58] Field of Search ................................ 526/200, 330

[56] References Cited

U.S. PATENT DOCUMENTS

| | | | |
|---|---|---|---|
| 4,093,776 | 6/1978 | Aoki et al. | 428/402 |
| 4,228,277 | 10/1980 | Landoll | 536/90 |
| 4,229,569 | 10/1980 | Feldman et al. | 528/501 |
| 4,352,916 | 10/1982 | Landoll | 526/200 |
| 4,552,939 | 11/1985 | Thaler et al. | 526/287 |

OTHER PUBLICATIONS

13 Encyclopedia of Polymer Science and Technology, pp. 552–571 and 801–859, (John Wiley & Sons, 1977).
Polymerization Processes, pp. 106–147, (Schildkrecht & Skeist eds., John Wiley & Sons, 1977).
18 Encyclopedia of Chemical Technology, "Polymerization Mechanisms & Processes", pp. 720–744, (John Wiley & Sons, Inc., 3rd Ed. 1982).
Craig, D. H., The Synthesis of Hydroxyethyl Cellulose–Stabilized Acrylic Latexes, Polymeric Materials Science and Engineering, 51, 172 (1984).
Craig, D. H., The Effect of Molecular Weight on the Grafting Reactions of Hydroxyethyl Cellulose During the Emulsion Polymerization of Vinyl Monomers, Polymeric Materials Science and Engineering, 52, 104 (1985).
Craig, D. H., The Effect of Hydroxyethyl Content of Grafting Reactions of Hydroxyethyl Cellulose During Emulsion Polymerization of Vinyl Monomers, Polymeric Materials Science and Engineering, 53, 529 (1985).
Craig, D. H., Polymeric Surfactants Based on Hydroxyethyl Cellulose as Stabilizers in Emulsion Polymerization Polymeric Materials Science and Engineering, 54, 354 (1986).
Craig, D. H., Monomer Grafting Reactions of Hydroxyethyl Cellulose in the Presence of Nonoxidizing Radical Initiators Polymeric Materials Science and Engineering, 54, 370 (1986).

*Primary Examiner*—Christopher Henderson
*Attorney, Agent, or Firm*—Joanne L. Horn; Mark D. Kuller

[57] ABSTRACT

Disclosed are aqueous dispersions having improved rheological and stability characteristics prepared by the emulsion polymerization of low protective colloid grafting potential monomers in the presence of a hydrophobically modified hydroxyethyl cellulose. The resultant aqueous dispersions or latices are useful in the manufacture of latex paints, binders for nonwoven materials, water-based inks, paper coatings and water-borne adhesives, such as pressure-sensitive adhesives.

10 Claims, No Drawings

HYDROPHOBICALLY MODIFIED HYDROXYETHYL CELLULOSE IN AQUEOUS POLYMERIZATION DISPERSIONS

This invention relates to aqueous polymer dispersions derived from monomers having a low tendency for grafting onto water-soluble protective colloids having improved rheological and stability characteristics and to processes for their preparation. The aqueous polymer dispersions are useful in the manufacture of latex paints, binders for nonwoven materials, water-based inks, paper coatings and water-borne adhesives, such as pressure-sensitive adhesives.

It is known that the presence of protective colloids, such as hydroxyethylcellulose (HEC) and polyvinyl alcohol, in the emulsion polymerization of ethylenically unsaturated monomers, including vinyl monomers, with an acrylic monomer, such as acrylic esters, methacrylic esters or mixtures thereof, provides latices of submicron particle size and improved stability and performance. Although several theories have been postulated for this phenomena, they have been speculative at best. Recently, reported studies have shown that the grafting reactions of the acrylic units of the vinyl monomer-acrylic copolymer with the HEC provide that improved stability. These studies also show that vinyl acetate, on the other hand, does not graft readily to HEC under typical emulsion polymerization conditions and, therefore, do not provide mechanically stable latices. (See Craig, D. H., *Polymeric Materials Science and Engineering*, 51, 172 (1984); 52, 104 (1985); 53, 529 (1985); 54, 354 & 370 (1986)). In view of these studies, one would not expect vinyl esters, vinyl ethers, vinyl chloride, N-vinyl pyrrolidone, ethylene and $C_3$ or greater alpha-olefins to graft readily to HEC during emulsion polymerization in view of their known lack of reactivity toward carbon radicals. Hence, latices prepared by the emulsion polymerization of such monomers in the presence of protective colloids, such as HEC, would likewise lack mechanical stability.

In some instances, the lack of mechanical stability may be overcome by using high levels, generally about 2% or more by weight of the total monomer content, of the protective colloid in the emulsion polymerization, or by copolymerization with acrylic monomers. However, latices prepared with such high levels of protective colloid do not have good water resistance and adhesion and latices prepared with acrylic comonomers are difficult to prepare uniformly due to the known differences in reactivity of acrylic monomers versus vinyl esters, vinyl ethers, vinyl halides and the like.

Thus, there exists a need for a protective colloid which, when used at low concentrations, can be easily and readily incorporated in latices prepared by the emulsion polymerization of such low or nongrafting monomers to provide latices having the improved mechanical stability as a result of the successful incorporation of the protective colloid.

In accordance with this invention, it has been found that from about 0.01% to about 1.7%, by weight based on the total monomer content, of a hydrophobically modified hydroxyethyl cellulose, as defined below, is readily and successfully incorporated in dispersions or latices by the emulsion polymerization of monomers having a low protective colloid-grafting potential. The resultant latices have a particle size of less than 1.0 micron and excellent mechanical stability. Latex paints formulated with these latices exhibit good water and abrasion resistance.

The hydrophobically modified hydroxyethyl cellulose is preferably present in an amount from about 0.05% to about 1%, most preferably from about 0.1% to about 0.5%, by weight based on the total monomer content.

Latices having a particle size greater than 1 micron can be produced using about 2% or more of the hydrophobically modified hydroxyethyl cellulose, i.e., the same concentrations typically required for HEC to impart good mechanical stability to latices. However, the resultant large particle latices tend to settle out over time, usually in about one week. This settling is not reversible. Hence, this lack of storage stability makes such large particle size latices undesirable since latices are generally stored for longer than a week. For example, they can be stored for up to one year before use. Hence, the amount of HMHEC present during the emulsion polymerization is critical to providing latices which have the improved properties set forth herein above and are storage stable as well.

The hydrophobically modified hydroxyethyl cellulose useful in the practice of this invention is a hydroxyethyl cellulose which is further substituted with a hydrocarbon radical having from 8 to 25 carbon atoms, preferably from 8 to 20 carbon atoms, in an amount, by weight of the hydrophobically modified hydroxyethyl cellulose, from about 0.1% to about 2.0%, preferably from about 0.4% to about 0.9%.

The term "hydrocarbon radical" as used herein is meant to include the hydrocarbon portion as well as any other moiety present, such as an ester, ether, or urethane moiety, as a result of the particular compound used to further substitute the hydroxyethyl cellulose.

The hydroxyethyl cellulose to be modified can be low to high molecular weight, i.e., less than about 50,000 to about 400,000, preferably 280,000 to about 400,000, and has a hydroxyethyl M.S. of from about 2.5 to about 3.5, preferably about 2.9 to about 3.5. The designation M.S. refers to the average number of moles of the hydroxyethyl substituent groups per cellulosic anhydroglucose unit of the cellulose molecule. The molecular weight is determined by extrapolation from the degree of polymerization. The molecular weight of the hydrophobically modified hydroxyethyl celluloses can be varied by degradation or depolymerization by any conventional means of degradation, such as treatment with peroxide, to obtain the desired molecular weight, either before or after substitutions with the hydroxyethyl and hydrophobic groups.

The hydrophobically modified hydroxyethyl cellulose can be prepared by the methods set forth in U.S. Pat. No. 4,228,277, the disclosures of which are incorporated herein by reference.

The hydroxyethyl cellulose is available commercially or can be prepared by any known method, such as by treating a cellulose furnish with ethylene oxide in an alkaline medium. Any cellulose furnish can be used, such as wood pulp or chemical cotton.

Typically the cellulosic furnish has a degree of polymerization (D.P.) from about 1300 to about 2300. D.P. is the number of anhydroglucose units in the cellulose backbone as determined by a five point intrinsic viscosity determination.

In general, any monomer which would be expected to exhibit little potential for aqueous phase grafting to protective colloids can be used in the practice of this invention.

Suitable monomers having low protective colloid-grafting potential include vinyl esters, vinyl ethers, vinyl and vinylidene halides, N-vinyl pyrrolidone, ethylene, $C_3$ or greater alpha-olefins, allyl amines, allyl esters of saturated monocarboxylic acids and amides thereof.

Suitable vinyl esters include aliphatic vinyl esters, such as vinyl formate, vinyl acetate, vinyl propionate, vinyl butyrate, vinyl isobutyrate, vinyl valerate, vinyl caproate and vinyl versatate.

Typical vinyl ethers include methylvinyl ether, ethylvinyl ether and n-butylvinyl ether.

Suitable $C_3$ or greater alpha-olefins include propylene, 1-butene, 1-pentene, 1-hexene, and 1-decene.

Allyl amine and substituted allyl amines are typical allyl amines.

Suitable allyl esters of saturated monocarboxylic acids, such as, allyl acetate, allyl propionate and allyl lactate, and their amides.

The resultant dispersions impart significant improvement to the wet-abrasion resistance of latex paints formulated with them.

Anionic, cationic, nonionic and amphoteric emulsifiers and mixtures thereof known in the art may be used in the practice of this invention. Suitable emulsifiers include polyglycol ethers, sulfonated paraffin hydrocarbons, higher alkyl sulfates such as lauryl sulfate, alkali metal salts of fatty acids such as sodium stearate and sodium oleate, sulfuric acid esters of fatty alcohols, ethoxylated $C_{4-12}$ alkyl phenols and their sulfonation products and also sulfosuccinic acid esters in amounts usually of from 0.1 to 5.0% by weight based on the monomers.

Any known methods of emulsion polymerization may be used, including batch, semi-batch, continuous or redox techniques. Semi-batch monomer addition with either batch or continuous addition of the initiator or catalyst is preferred. Preferably from about 1% to about 25% of the monomer or monomers is added in the initial charge to the reactor, most preferably about 5% to about 15%. The continuous addition of any reaction ingredient or ingredients is generally done over a period of from about 2 to about 5 hours. The batch or delayed initiator or catalyst addition may be used, although these variations are not necessary for the success of this invention.

In general, the monomers are polymerized in aqueous emulsion at from about 20° C. to about 120° C., preferably from about 50° C. to about 75° C., in the presence of a free radical polymerization initiator, particularly a water-soluble peroxide, e.g., hydrogen peroxide, persulfates such as potassium, sodium and ammonium persulfates or in some cases perborates. Other methods known in the art may also be used to polymerize acrylic monomers, such as, for example, by using redox polymerization catalysts.

The exact mechanism by which the hydrophobically modified hydroxyethyl celluloses provide stable latices is not known. However, it is theorized that the grafting reactions of monomers onto the protective colloid is enhanced by the presence of the hydrophobes over the unmodified hydroxyethyl cellulose.

All parts and percentages used in this specification are by weight unless otherwise indicated.

The following examples are illustrative of this invention.

EXAMPLE 1

This example illustrates one embodiment of the aqueous dispersions of this invention and how to prepare same.

A reaction vessel equipped with a stirrer, reflux condenser, thermometer, one feed port and a water jacket is charged with 44.8 parts distilled water, 1.5 parts of a 5% aqueous solution of sodium bicarbonate, 0.7 parts octylphenol ethoxylate having 10 moles of ethylene oxide, 2.3 parts disodium salt of the ethoxylated fatty alcohol half ester of sulfosuccinic acid (marketed under Aerosol A-102 by American Cyanamid Co.), and 0.2 parts hydrophobically modified hydroxyethyl cellulose having a Brookfield LVT viscosity of 400 cps in a 1% aqueous solution at 25° C., 0.5% of a $C_{16}$ hydrophobe by weight of the hydrophobically modified hydroxyethyl cellulose, and a hydroxyethyl M.S. of 3.5. Stirring is continuous throughout the reaction. The temperature of the reactor is raised to 75° C. and maintained via ciculating hot water. Ten (10) parts of vinyl acetate in added. Two and five tenths (2.5) parts of a 5% aqueous solution of potassium persulfate is then added batchwise. The addition of 38 parts of the vinyl acetate is started and continued uniformly over a 2.5 hour period. The reaction temperature is maintained at 75° C. for 1 hour after the final addition of the monomer. The reaction mixture is then cooled by circulating cold water.

EXAMPLE 2

This example illustrates another embodiment of this invention.

The procedure and formulation of Example 1 are used except that a monomer mixture consisting essentially of 80% vinyl acetate and 20% VV-10 vinyl versatate monomer (a vinyl ester of a branced chain aliphatic acid marketed under VV-10 by Shell Chemical Company) is used instead of the vinyl acetate.

EXAMPLE 3

This example illustrates another embodiment of this invention.

The procedure of Example 1 and formulation of Example 2 are used except that a hydrophobically modified hydroxyethyl cellulose having 1.2% of a $C_{12}$ hydrophobe by weight of the hydrophobically modified hydroxyethyl cellulose is used instead of the hydrophobically modified hydroxyethyl cellulose having the $C_{16}$ hydrophobe.

EXAMPLE 4

This example illustrates another embodiment of this invention.

The procedure of Example 1 and formulation of Example 2 are used except that the hydrophobically modified hydroxyethyl cellulose is added as a 5% aqueous solution which has been heated for 1 hour on a steam bath in the presense of 1% of hydrogen peroxide, by weight of the hydrophobically modified hydroxyethyl cellulose, is used instead of the hydrophobically modified hydroxyethyl cellulose having a Brookfield LVT viscosity of 400 cps in a 1% aqueous solution at 25° C. The degradation with the hydrogen peroxide provides a HMHEC having a Brookfield viscosity of 36 cps in a 1% aqueous solution at 25° C.

Example 5

This example illustrates another embodiment of this invention.

The procedure of Example 1 and formulation of Example 2 are used except that 20.0 parts of a 5% aqueous solution of a hydroxyethyl cellulose having a 2.5 hydroxyethyl M.S. and a Brookfield viscosity of 115 cps in a 5% aqueous solution at 25° C. is used instead of the 0.7 parts octylphenol ethoxylate having 10 moles of ethylene oxide and the 2.3 parts disodium salt of the ethoxylated fatty alcohol half ester of sulfosuccinic acid.

EXAMPLE 6

This example illustrates another embodiment of this invention.

A reaction vessel equipped with a stirrer, reflux condenser, thermometer, one feed port and a water jacket is charged with 43.3 parts distilled water, 1.5 parts of a 5% aqueous solution of sodium bicarbonate, 3.4 parts octylphenol ethoxylate having 10 moles of ethylene oxide, 1 drop of a 2% aqueous solution of ferrous sulfate, 3.0 parts of a 5% aqueous solution of potassium persulfate, 4.0 parts of a 5% aqueous solution of hydrophobically modified hydroxyethyl cellulose having a Brookfield viscosity of 400 cps in a 1% aqueous solution at 25° C., 0.5% of a $C_{16}$ hydrophobe by weight of the hydrophobically modified hydroxyethyl cellulose, and a hydroxyethyl M.S. of 3.5, and 44 parts of a monomer mixture containing, by weight, 80 parts vinyl acetate and 20 parts VV-10 vinyl versatate monomer and stirred at room temperature (23° C.). Stirring is continuous throughout the reaction. After the temperature of the reactor has peaked at 75° C. and then fallen to 50° C., the solids content is determined gravimetrically and the reaction is then cooled by circulating cold water.

COMPARATIVE EXAMPLE 7

This example illustrates the need for hydrophobically modified hydroxyethyl cellulose (HMHEC) to be present during the emulsion polymerization of the low protective colloid-grafting potential monomers in order to provide a latices having excellent mechanical stability.

The procedure of Example 1 and formulation of Example 2 are used except that the hydrophobically modified hydroxyethyl cellulose is omitted and then added as a 5% aqueous solution (4 g solution to 96 g latex) after the latex is prepared and cooled to room temperature.

COMPARATIVE EXAMPLE 8

This example illustrates that HMHEC cannot be used as the sole emulsifier.

The procedure of Example 1 and formulation of Example 2 are used except that the 0.7 parts octylphenol ethoxylate having 10 moles of ethylene oxide and the 2.3 parts disodium salt of the ethoxylated fatty alcohol half ester of sulfosuccinic acid are omitted and except that 1.2 parts of the hydrophobically modified hydroxyethyl cellulose is used instead of 0.2 parts.

COMPARATIVE EXAMPLE 9

This example illustrates the lack of effectiveness of hydroxyethyl cellulose at low concentrations in the polymerization of low protective colloid-grafting potential vinyl acetate monomer.

The formulation and procedure of Example 1 are used except that a hydroxyethyl cellulose having a Brookfield viscosity of 400 cps in a 2% aqueous solution at 25° C. and a hydroxyethyl M.S. of 2.5 is used instead of the hydrophobically modified hydroxyethyl cellulose having a Brookfield viscosity of 400 cps in a 1% aqueous solution at 25° C., 0.5% of a $C_{16}$ hydrophobe by weight of the hydrophobically modified hydroxyethyl cellulose, and a hydroxyethyl M.S. of 3.5.

COMPARATIVE EXAMPLE 10

This example illustrates the lack of effectiveness of HEC at low concentrations in the copolymerization of low protective colloid-grafting potential vinyl monomers.

The procedure of Example 1 and formulation of Example 2 are used except that a hydroxyethyl cellulose having a Brookfield viscosity of 400 cps in a 2% aqueous solution at 25° C. and a hydroxyethyl M.S. of 2.5 is used instead of the hydrophobically modified hydroxyethyl cellulose having a Brookfield viscosity of 400 cps in a 1% aqueous solution at 25° C., 0.5% of a $C_{16}$ hydrophobe by weight of the hydrophobically modified hydroxyethyl cellulose, and a hydroxyethyl M.S. of 3.5.

COMPARATIVE EXAMPLE 11

This example illustrates the emulsion polymerization of a vinyl acetate-based monomer mix containing a monomer having a high protective colloid-grafting potential in the presense of a hydrophobically modified hydroxyethyl cellulose.

The procedure and formulation of Example 1 are used except that a monomer mixture consisting of 85 parts vinyl acetate and 15.0 parts butyl acrylate is used instead of the vinyl acetate. The resultant latex has a particle size greater than 1.0 microns.

COMPARATIVE EXAMPLE 12

This example illustrates the emulsion polymerization of monomers having high protective colloid-grafting potential in the presence of a hydrophobically modified hydroxyethyl cellulose.

The procedure and formulation of Example 1 are used except that a monomer mixture consisting of 42.7 parts butyl acrylate, 56.8 parts methyl methacrylate and 0.5 parts methacrylic acid is used instead of the vinyl acetate.

The properties of the the latices of the foregoing Examples and Comparative Examples are set forth in Table I.

TABLE I

| Example | pH | Solids, Wt. % | Viscosity, cps[1] | Particle Size, microns[2] | Shear Stability[3] |
| --- | --- | --- | --- | --- | --- |
| 1 | 4.8 | 48 | 2940 | 0.31 | No (coagulated in 1 minute) |
| 2 | 4.8 | 50 | 2800 | 0.45 | Yes |
| 3 | 4.7 | 50 | 3020 | 0.51 | Yes |
| 4 | 4.8 | 50 | 2900 | 0.33 | Yes |
| 5 | 4.2 | 50 | 114 | 0.70 | Yes |
| 6 | 4.5 | 48 | 250 | 0.32 | Yes |
| 7 | 4.9[4] | 50[4] | 150[4] | 0.13[5] | No (coagulated in 1 minute)[5] |

TABLE I-continued

| Example | pH | Solids, Wt. % | Viscosity, cps[1] | Particle Size, microns[2] | Shear Stability[3] |
|---------|-----|------------|------------------|---------------------------|--------------------|
| 8 | — | Coagulated | — | — | — |
| 9 | 4.8 | 50 | 1800 | 0.23 | No (coagulated in 15 seconds) |
| 10 | 4.8 | 50 | 2460 | 0.34 | No (coagulated in 5 minutes) |
| 11 | 4.8 | 48 | 46 | 2.9+ | Yes |
| 12 | — | Coagulated | — | — | — |

[1] Brookfield Model LVT viscosity at 25° C. before shearing the sample in a Waring blender for 10 minutes at the highest speed.
[2] Coulter Nanosizer particle size reading before shearing the sample in a Waring blender for 10 minutes at the highest speed.
[3] Ten minutes in a Waring blender at highest speed.
[4] Before the addition of the hydrophobically modified hydroxyethyl cellulose.
[5] Taken after the addition of the hydrophobically modified hydroxyethyl cellulose, latex coagulated in 5 seconds in total absense of HMHEC.

EXAMPLE 13

The example illustrates the use of the latices of this invention in flat latex paint formulations and how to prepare them.

The latex paint is prepared by charging a Cowles disperser with the first 13 ingredients set forth below in Table II and mixing and grinding at high speed for 20 minutes. The remaining 3 ingredients of Table II are then added to the disperser and the mixture is ground at medium speed for 20 minutes.

TABLE II

| Ingredients | Parts by Weight |
|-------------|-----------------|
| Distilled water | 444.5 |
| Potassium tripolyphosphate | 2.0 |
| Lecithin | 2.0 |
| Aqueous diisobutylene-maleic acid copolymer, Na salt (25% solids) | 5.0 |
| Defoamer 501 hydrophobic surface-modified silica** | 2.0 |
| Ethylene glycol | 20.0 |
| Diethylene glycol monobutyl ether acetate | 10.0 |
| Titanium dioxide, paint grade | 175.0 |
| Calcium carbonate | 150.0 |
| Iceberg clay | 125.0 |
| Silica, 3 microns average particle size; 99.5% SiO$_2$ | 25.0 |
| Nonylphenoxy polyethyleneoxyethanol (10) | 3.0 |
| Hydroxyethyl cellulose having a 2.5 M.S. | 5.5 |
| Bromobenzylacetate | 0.5 |
| Latex of Example 2* | 200.0 |
| Distilled water | 56.0 |

*Based on 48% solids latex. The amount of wet latex and water added during the let-down stage will vary according to the weight percent latex solids. All latexes are formulated to 96 g dry latex solids.
**Available from Hercules Incorporated.

COMPARATIVE EXAMPLE 14

The procedure and formulation of Example 13 are used except that the latexes of Comparative Example 10 is used instead of the latex of Example 2.

The properties of the latex formulations of Example 13 and Comparative Example 14 are set forth in Table III below:

TABLE III

| Example | Abrasion Resistance[1], Cycles to Failure |
|---------|------------------------------------------|
| 13 | 718 |
| 14 | 496 |

[1] Represents scrub cycles to failure of 78 PVC flat paint films after 4 days aging formulated with the respective latex according to ASTM D-2486-74a.

Thus this invention provides low viscosity and shear and storage stable latices having a particle size of less than 1 micron and good flow behavior which can be formulated into latex paints having good water and abrasion resistance and into water-borne adhesives.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What I claim is:

1. A process for the emulsion polymerization of low protective colloid-grafting potential ethylenically unsaturated monomers in the presence of a polymerization catalyst wherein the improvement comprises conducting the emulsion polymerization in the presence of from about 0.01% to about 1.7%, by weight of the total monomer content, of a hydrophobically modified hydroxyethyl cellulose having a hydrocarbon radical having from 8 to 25 carbon atoms in an amount of from about 0.1% to about 2.0%, by weight of the hydrophobically modified hydroxyethyl cellulose, and a hydroxyethyl M.S. of from about 2.5 to about 3.5 and the emulsion polymerization process produces polymer latices having a particle size of less than 1.0 micron.

2. The process of claim 1 wherein the emulsion polymerization comprises polymerizing the low protective colloid-grafting potential monomers in an aqueous emulsion at from about 20° C. to about 120° C. in the presence of a water-soluble free radical polymerization initiator.

3. The process as claimed in claim 2 wherein the free radical polymerization initiator is a water-soluble peroxide.

4. The process of claim 1 wherein the hydrocarbon radical of the hydrophobically modified hydroxyethyl cellulose is present in an amount from about 0.4% to about 0.9%, by weight of the hydrophobically modified hydroxyethyl cellulose.

5. The process of claim 1 wherein the hydrophobically modified hydroxyethyl cellulose is present in an amount from about 0.05% to about 1%.

6. The process as claimed in claim 1 wherein the hydrophobically modified hydroxyethyl cellulose is present in an amount from about 0.1% to about 0.5%.

7. The process of claim 3 wherein the low protective colloid-grafting potential monomers are selected from the group consisting of vinyl esters, vinyl ethers, vinyl and vinylidene halides, N-vinyl pyrrolidone, ethylene, C$_3$ or greater alpha-olefins, allyl amines, allyl esters of saturated monocarboxylic acids and amides thereof.

8. The process of claim 1 wherein the hydrophobically modified hydroxyethyl cellulose has a hydrocarbon radical having from 8 to 20 carbon atoms and a hydroxyethyl M.S. of from about 2.9 to about 3.5.

9. The process of claim 1 wherein the hydrocarbon radical of the hydrophobically modified hydroxyethyl cellulose is present in an amount from about 0.1% to about 2.0%, by weight of the hydrophobically modified hydroxyethyl cellulose.

10. The process of claim 1 wherein the low protective colloid-grafting potential ethylenically unsaturated monomers selected from the group consisting of vinyl esters, vinyl ethers, vinyl and vinylidene halides, N-vinyl pyrrolidone, ethylene, $C_3$ or greater alpha-olefins, allyl amines, allyl esters of saturated monocarboxylic acids and amides thereof.

* * * * *

UNITED STATES PATENT AND TRADEMARK OFFICE
CERTIFICATE OF CORRECTION

PATENT NO.   :   4,684,704
DATED        :   August 4, 1987
INVENTOR(S)  :   Daniel H. Craig It is certified that error appears in the above-identified patent and that said Letters Patent are hereby corrected as shown below:

Column 4 - Line 38          " branced "

Should read          -- branched --

Column 8 - Lines 37 & 38    " about about "

Should read          -- about --

Column 10 - Line 4          " potential ethylenically unsaturated monomers "

Should read          -- potential monomers --

Signed and Sealed this

Twenty-second Day of December, 1987

Attest:

DONALD J. QUIGG

*Attesting Officer*      *Commissioner of Patents and Trademarks*